United States Patent

[11] 3,582,873

[72] Inventors Charles Floyd George, Jr.
2600 Meandering Way, Plano, Tex. 75074;
Howard A. Slack, 4856 Nashwood Lane,
Dallas, both of, Tex. 75234; Ronald K.
Scudder, 32 Via Floreado, Orinda, Calif.
94563
[21] Appl. No. 767,796
[22] Filed Oct. 15, 1968
[45] Patented June 1, 1971

[54] DYNAMIC AMPLITUDE RECOVERY
6 Claims, 5 Drawing Figs.
[52] U.S. Cl.................................................. 340/15.5
[51] Int. Cl................................................... G01v 1/28
[50] Field of Search.......................................... 340/15.5
RSC, 15.5 RRC, 15.5 FC, 15.5 GC, 15.5 IF

[56] References Cited
UNITED STATES PATENTS
| | | | |
|---|---|---|---|
| 3,312,933 | 4/1967 | Lawrence et al. ............ | 340/15.5 |
| 2,062,151 | 11/1936 | Weatherby.................... | 340/15.5 |
| 2,304,740 | 12/1942 | Minton......................... | 340/15.5 |

Primary Examiner—Richard A. Farley
Assistant Examiner—Daniel C. Kaufman
Attorneys—Blucher S. Tharp and Robert E. Lee, Jr.

ABSTRACT: Processes for improving seismic signals whereby attenuated frequencies are restored. The restoration of a seismic trace is accomplished by adding proper quantities of even numbered derivatives back into the trace with larger proportions added at greater times to counteract the effect of larger attenuations.

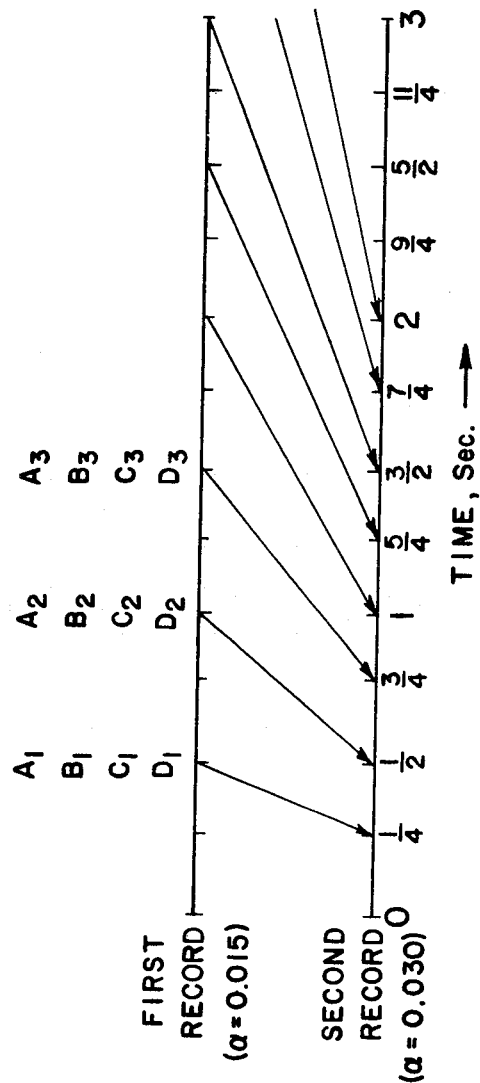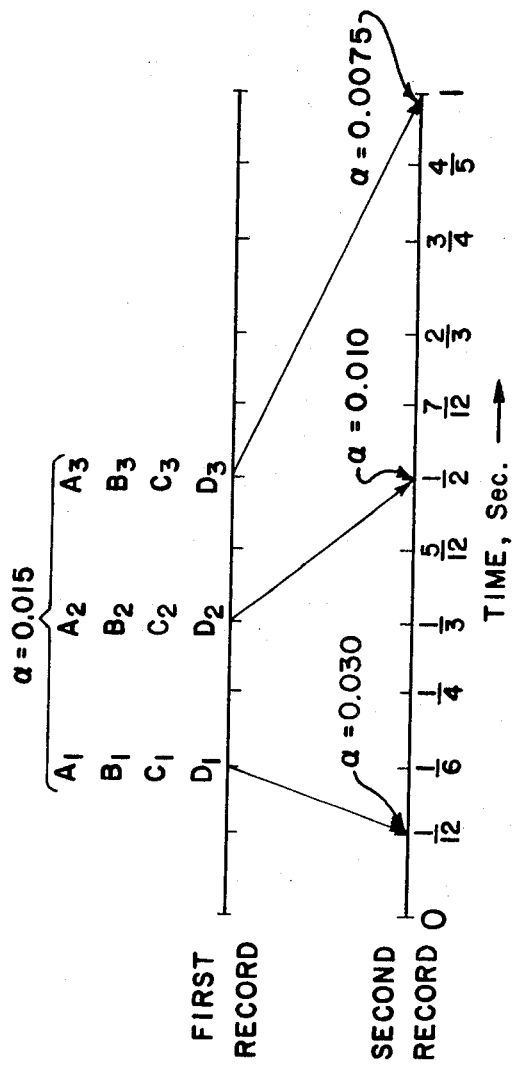
Fig. 3
Fig. 4
INVENTORS
Charles Floyd George Jr.
Howard A. Slack
Ronald K. Scudder
BY Robert Ellsworth Lee
Attorney INVENTORS
Charles Floyd George Jr.
Howard A. Slack
Ronald K. Scudder
BY
Robert Ellsworth Lee
Attorney

DYNAMIC AMPLITUDE RECOVERY

BACKGROUND OF THE INVENTION

The invention pertains to processing seismic data and particularly concerns treating a given seismogram so as to restore the amplitudes of the attenuated frequencies to their original level.

Attenuation in seismic signals appears exponentially at a rate proportional to both time and frequency. The result of this attenuation is an apparent lowering of the dominant frequency of a trace with time and an accompanying loss of resolution. Past attempts to remedy this situation have centered on the method of separating each seismic trace into selected frequency components; amplifying the several frequency components to selected levels; and then recombining the frequency components following the gain adjustment. Reference is made to U.S. 3,327,805 (patented June 27, 1967), which exemplifies the state of the art. The object of this approach is to individually adjust the gain of each frequency separate and apart from the other frequencies, so as to duplicate the frequency force spectrum of the input seismic signal.

The obvious difficulty with this technique is that it is impractical to attempt to separate the seismic signal into pure frequency components; at best, the seismic signal is divided into bands or frequency ranges. Another point of difficulty is that restoration is not possible unless the original input signal is known. This method may be adequate for analog data, but the greater dynamic range offered by digital recording makes it desirable to obtain more complete amplitude recovery than in the past.

SUMMARY OF THE INVENTION

The present invention provides a new process for correcting a seismic trace for decay in amplitude resulting from divergence and frequency dependent attenuation as it passes through the earth.

One or more even numbered derivatives are taken of the seismic trace starting with the second derivative. Preferably, the second, fourth, and sixth derivatives are all determined; however, the process can be practiced with just the second and fourth derivatives, or only the second derivative. Next, the seismic trace and each of the selected derivatives are multiplied by a separate gain function; the gain of the original trace and each of its derivatives is adjusted with respect to time, with the higher derivatives being weighted proportionally greater at the higher frequencies. After the gain adjustment, the seismic trace and the derivative(s) are added to give a summation trace which is essentially equivalent, with respect to amplitude and resolution, to the original trace before attenuation.

It appears that dynamic amplitude recovery, as practiced by applicants, offers a significant improvement in record quality. The process is fast and can be applied to time varying attenuation rates. Moreover, the restoration is accomplished by processing the raw seismic data without the need to make correlations with the input signal introduced into the earth.

BRIEF DESCRIPTION OF THE DRAWINGS

FIG. 3 is a graphical illustration showing the application of derivative coefficients for a first record to a second record having a different attenuation rate.

FIG. 4 is a graphical illustration showing the application of derivative coefficients for a first record to a second record where the attenuation rate is variable over the record section.

DETAILED DESCRIPTION OF THE INVENTION

Figure 1:
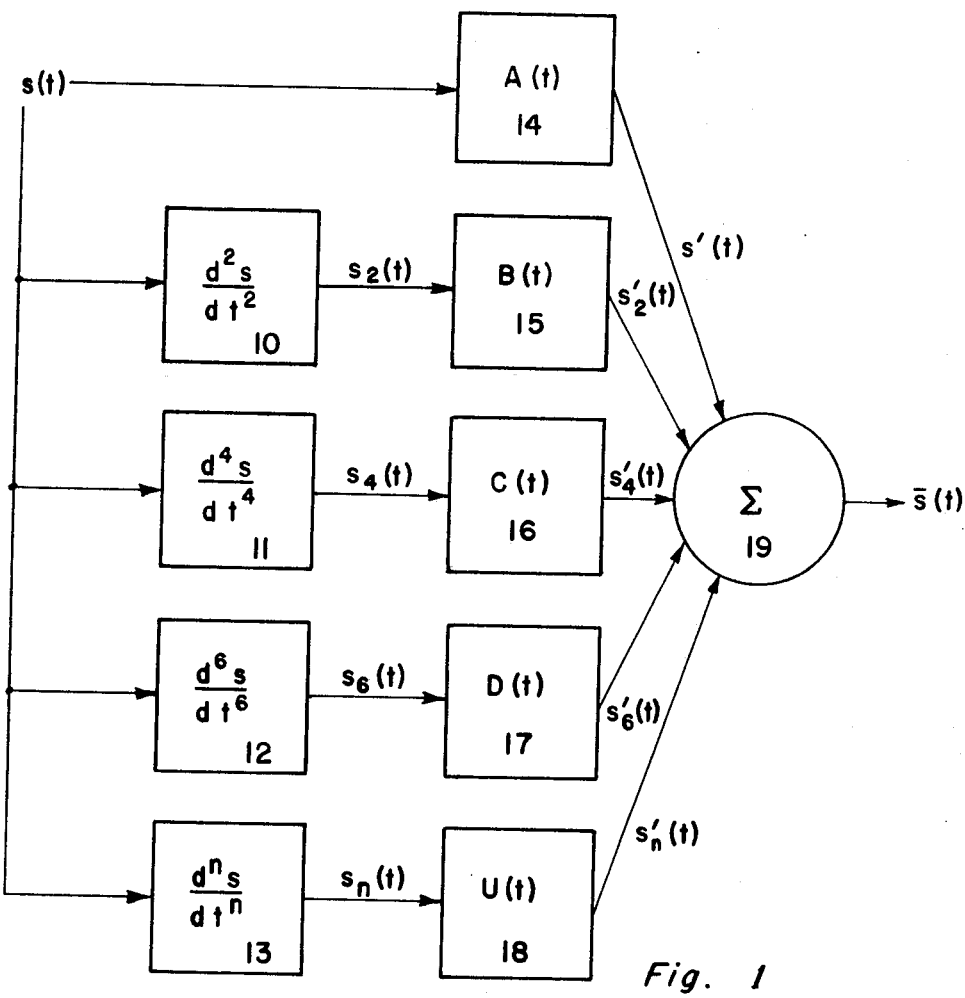
FIG. 1 is a block drawing illustrating the basic process of the invention.

If no attenuation is present in a seismic record, and if the frequency content of the record is band-limited, then a digitized signal s can be represented over a time interval $T_i$ by the series:

$$s(n\Delta T) = \sum_K [a_K \cos(2\pi n K F \Delta T) + b_K \sin(2\pi n K \Delta T)] \quad (1)$$

where $F = 1/T_i$, $K$ and $n$ are integers, $a_K$ and $b_K$ = Fourier coefficients, and $T$ is the sampling increment (which is dependent upon the highest frequency present in the wave). Assuming that these same frequencies travel through the earth, they will be attenuated exponentially at the rate of e where $\alpha$ is the attenuated rate and is dependent upon the particular type of earth material, $f$ is frequency, and $t$ is time. As an approximation the new wave can be written with the same sine and cosine coefficients with the exponential attenuation shown explicitly:

$$s(n\Delta T) = \sum_K [a_K \cos(2\pi n K F \Delta T) + b_K \sin(2\pi n K F \Delta T)] e^{-\alpha n K F \Delta T} \quad (2)$$

This expression is believed to be an accurate representation of the attenuation signal for digitized data (recognizing that for a particular frequency $\alpha$ may vary with time).

If the original signal is to be recovered, the effect of the exponential term must be eliminated. This could be accomplished if the sine and cosine coefficients of the original signal could be determined. Then the original wave could be recovered simply by multiplying sine and cosine waves at the proper frequencies by the determined coefficients and adding the results. However, the desired coefficients cannot be derived from the data without a knowledge of the exact value of the attenuation coefficient $\alpha$ and then only after solution of a large number of simultaneous linear equations. (The number of equations which must be solved is equal to the number of sample points in the original trace.)

It is not useful to Fourier analyze the signal, because extraction of the coefficients depends upon the orthogonality of the sine and cosine terms. If a sine or cosine function is being attenuated, it is no longer orthogonal to other sines and cosines over a common time period because the attenuation introduces new frequencies.

The solution of the problem is to avoid searching for the sine and cosine coefficients entirely. Since the derivative of a wave increases the high frequency content, high frequencies can be regained by adding in appropriate derivatives.

Let the signal be written as:

$$s(t) = \sum_i [a_i \cos(\omega_i t) + b_i \sin(\omega_i t)] e^{-\alpha \omega_i t} \quad (3)$$

where $\omega_i = 2\pi f_i$ (where $f_i$ = a particular frequency). Then, the first derivative is $$\frac{ds}{dt} = \sum [-a_i \omega_i \sin(\omega_i t) + b_i \omega_i \cos(\omega_i t)] e^{-\alpha \omega_i t}$$

$$+ \sum [-\alpha \omega_i][a_i \cos(\omega_i t) + b_i \sin(\omega_i t)] e^{-\alpha \omega_i t} \quad (4)$$

and the second derivative is $$\frac{d^2 s}{dt^2} = \sum [-\alpha b_i \omega_i^2 + \alpha^2 a_i \omega_i - a_i \omega_i^2 - b_i \omega_i^2] \cos(\omega_i t) e^{-\alpha \omega_i t}$$

$$+ \sum [-b_i \omega_i^2 + \alpha a_i \omega_i^2 + b_i \alpha^2 \omega_i^2] \sin(\omega_i t) e^{-\alpha \omega_i t} \quad (5)$$

If $\alpha$ is sufficiently small, terms containing it can be ignored, and the resulting first two derivatives become:

$$\frac{ds}{dt} = \sum [-a_i \omega_i \sin(\omega_i t) + b_i \omega_i \cos(\omega_i t)] e^{-\alpha \omega_i t} \quad (6)$$

$$\frac{d^2 s}{dt^2} = -\sum [a_i \omega_i^2 + \cos(\omega_i t) + b_i \omega_i^2 \sin(\omega_i t)] e^{-\alpha \omega_i t} \quad (7)$$

A problem arises in the case of the first derivative. The cosine term has changed to a minus sine and the sine term has changed to a cosine. This results in a phase change from the original wave which cannot be tolerated if reliable reconstruction is to result. However, in the case of the second derivative, the cosine of the original wave is now a minus cosine and the sine term is a minus sine. Therefore, after multiplication by minus one, the second derivative terms will be back in phase with their original counterparts. It follows that the second derivative can be used in reconstruction, but that the first derivative cannot.

The third derivative can be expressed as follows:

$$\frac{d^3s}{dt^3} = \sum [a_i\omega_i^3 \sin(\omega_i t) - b_i\omega_i^3 \cos(\omega_i t)] e^{-\alpha\omega_i t} \quad (8)$$

This is out of phase with the original wave such that correction is not possible.

The fourth derivative, shown below, $$\frac{d^4s}{dt^4} = \sum [a_i\omega_i^4 \cos(\omega_i t) + b_i\omega_i^4 \sin(\omega_i t)] e^{-\alpha\omega_i t} \quad (9)$$

is back in phase with the generating wavelet.

The fifth derivative $$\frac{d^5s}{dt^5} = \sum [-a_i\omega_i^5 \sin(\omega_i t) + b_i\omega_i^5 \cos(\omega_i t)] e^{-\alpha\omega_i t} \quad (10)$$

is like the first and third derivatives; it is irrevocably out of phase.

The sixth derivative $$\frac{d^6s}{dt^6} = -\sum [a_i\omega_i^6 \cos(\omega_i t) + b_i\omega_i^6 \sin(\omega_i t)] e^{-\alpha\omega_i t} \quad (11)$$

resembles the second derivative; it is 180° out of phase, but can easily be corrected.

This sequence repeats itself with the result that all odd numbered derivatives are out of phase with the generating wavelet such that they cannot be used for reconstruction.

The even numbered derivatives can all be expressed by the general formula $$\frac{d^ns}{ds^n} = \pm \sum [a_i\omega_i^n \cos(\omega_i t) + b_i\omega_i^n \sin(\omega_i t)] e^{-\alpha\omega_i t} \quad (12)$$

where $n$ is an even number. (If the quotient of $n$ divided by 2 is an odd number, the sign on the outside of the summation series is negative and if the quotient is an even number, the sign is positive.) Hence, even numbered derivatives are either in phase or 180° out of phase with the generating wavelet. Those out of phase can be placed in phase by simple phase inversion so that the even numbered derivatives can be utilized to the extent necessary to aid in recovering the lost frequencies.

If the original trace and each of its even derivatives are multiplied by weighting factors which are functions of time and added together at a particular instance of time, the result, $R$, can be written:

$$R = \sum [A + B\omega_i^2 + C\omega^4_i + D\omega_i^6 \cdots + U\omega_i^n] e^{-\alpha\omega_i t}$$
$$[a_i \cos(\omega_i t) + b_i \sin(\omega_i t)] \quad (13)$$

where $A, B, C, D, \ldots U$ are weighting factors for the original trace, the second derivative, the fourth derivative, the sixth derivative, and the $n^{th}$ derivative, respectively.

Now, if the first bracketed term is made equal to one for all values of frequency, at any given time, $T_j$, the effect of the expotential frequency attenuation will have been removed. (Parameters A, B, C, D, and U can be selected to give a good fit by numerical methods.)

The invention can better be understood by referring to FIG. 1 where seismic trace $s(t)$ is processed to recover the amplitudes of its attenuated signals. Differentiating circuits 10, 11, 12, and 13 take the even order derivatives of $s(t)$, as will be explained in conjunction with FIG. 2. Multipliers 14, 15, 16, 17, and 18 are programmed gain amplifiers having gains as a function of time which correspond to A($t$), B($t$), C($t$), D($t$), and U($t$), respectively. Trace $s(t)$ and derivatives $s_2(t)$, $s_4(t)$, $s_6(t)$, and $s_n(t)$ are multiplied by the aforesaid gain functions so that they are properly weighted for adding. Outputs $s'(t)$, $s'_2Qt)$, $s'_4(t)$, $s'_6(t)$, and $s'_n(t)$ are then combined by addition circuit 19. The resulting output trace $\bar{s}(t)$ is what trace $s(t)$ was before attenuation, i.e. trace $s(t)$ with the amplitude of all of its frequencies fully recovered.

Figure 2:
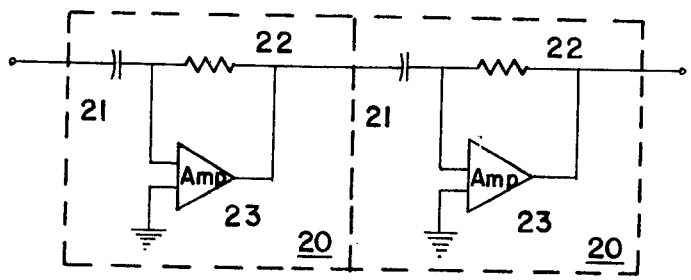
FIG. 2 is a schematic diagram showing a pair of differentiators for taking the second derivative of a function.

Referring to FIG. 2, a differentiating circuit composed of a cascade of differentiators 20 is shown for taking the second derivative of a function. Each differentiator 20 is comprised of capacitor 21, resistor 22, and operational amplifier 23. Circuits of this type are discussed more fully in "Applications Manual for Computing Amplifiers", pages 48—49, by George A. Philbrick Researchers, Inc., Nimrod Press, Inc., Boston, Mass. (1966); and "Analog and Digital Computer Technology", Chapter 4, by Norman R. Scott, McGraw-Hill Publishing Co. (1960). In operation, each differentiator 20 takes the derivative of the input function so that the combined effect of two units is to compute the second derivative. (In a similar manner, the fourth derivative can be obtained by using a series arrangement of four differentiators; the sixth derivative, by using a series arrangement of six differentiators; etc.)

Now, let us consider ways to solve for coefficients A, B, C, D, and U. First, transposing the terms of equation 13 and changing to base 10 we have $$[A + B\omega^2 + C\omega^4 + D\omega^6 \ldots + U\omega^n] = 10^{\alpha\omega T_j} \quad (14)$$

Normalizing the process around 10 cps, the problem reduces to finding A, B, C, D, and U in the expression $$\left[ A + B\left(\frac{F}{10}\right)^2 + C\left(\frac{F}{10}\right)^4 + D\left(\frac{F}{10}\right)^6 \cdots + U\left(\frac{F}{10}\right)^n \right] = 10^{\alpha(F-10)T_j} \quad (15)$$

At low frequencies, e.g. 20 cps, the constant term, i.e. A, dominates the expression. At higher frequencies, the second term, i.e.

$$B\left(\frac{F}{10}\right)^2,$$

is dominate. At still higher frequencies, the third term, i.e.

$$C\left(\frac{F}{10}\right)^4,$$

is the main contributor to the approximation. Finally, the fourth term, i.e.

$$D\left(\frac{F}{10}\right)^6,$$

becomes predominate at very high frequencies. Terms which are functions of derivatives greater than the sixth derivative can generally be ignored since they are unimportant at conventional frequency ranges. Therefore, in most instances the problem can be solved by determining coefficients A, B, C, and D; sometimes it is only necessary to find A, B, and C, or even just A and B.

Now assume that coefficients A, B, C, and D are to be determined. The first step in the approximation consists in finding the value of D that minimizes $$\sum_{F_2}^{F_1} \left[ 10^{\alpha(F-10)t} - D\left(\frac{F}{10}\right)^6 \right]^2 \quad (16)$$

where $F_1 - F_2$ is the frequency range over which term $D$ is dominant.

$$Z_1 = 10^{\alpha(F-10)t} - D\left(\frac{F}{10}\right)^6 \quad (17)$$

is then generated. Next $C$ is approximated by determining the value that minimizes $$\sum_{F_4}^{F_3} \left[ Z_1 - C\left(\frac{F}{10}\right)^4 \right]^2 \quad (18)$$

where $F_3$–$F_4$ is the frequency over which term $C$ is dominant.
The function $$Z_2 = Z_1 - C\left(\frac{F}{10}\right)^4 \qquad (19)$$

is then generated. The contribution of the second derivative is found by minimizing $$\sum_{F_6}^{F_5}\left[Z_2 - B\left(\frac{F}{10}\right)^2\right]^2 \qquad (20)$$

where $F_5$–$F_6$ is the frequency range where term $B$ is the controlling influence.

The resulting function is $$Z_3 = Z_2 - B\left(\frac{F}{10}\right)^2 \qquad (21)$$

Finally, constant $A$ is determined by minimizing $$\sum_{F_8}^{F_7}[Z_3 - A]^2 \qquad (22)$$

where $F_7$–$F_8$ is the frequency interval in which $A$ is predominant.

At this point, a relatively accurate choice has been made of the coefficients, but the results can be greatly improved by repeating the process to find residual portions of the derivatives.

The results are also influenced by the choice of frequency ranges which should be selected to give the closest fits. In most cases, the optimum frequency ranges vary with time as a decreasing function, so that several choices of frequency ranges are necessary to process a single trace.

For intermediate times, i.e. 1 to 3 seconds, the following frequency ranges are suggested:

$F_{1-2}$ 60–45 c.p.s.
$F_{3-4}$ 50–30 c.p.s.
$F_{5-6}$ 40–20 c.p.s.
$F_{7-8}$ 20–10 c.p.s.

The values of $\alpha$ for the different rock types are determined experimentally by procedures well known in the art. Reference is made to "Seismic Waves: Radiation, Transmission, and Attenuation" by J. E. White, McGraw-Hill Book Company (1965). Chapter 3, pages 79—141, concerning loss mechanisms and attenuation is particularly pertinent and all tables shown therein are intended to be a part of the present specification. A more recent discussion of attenuation rates is found in "Wave Attenuation and Internal Friction as Functions of Frequency in Rocks", Geophysics Vol. XXXI, No. 6 (Dec. 1966), pages 1049—1056, by Attewell and Ramana.

To simply calculations, it is desirable to be able to use the same set of derivative coefficients A, B, C, and D for all choices of $\alpha$. This can be accomplished as illustrated in FIG. 3. Assume that the value of $\alpha$ for a first second is 0.015 and that A, B, C, and D have been determined at intervals of ½ second. The value of A for $t=0$ will be one, while the values of B, C, and D will be zero. (At zero time no attenuation has yet taken place.) If a second record is now encountered that has an attenuation rate of 0.030, the values of derivative coefficients A, B, C, and D of the first record at ½ second can be applied to the second record at ¼ second—since the function $10^{-\alpha Ft}$ has the same frequency dependence when $t=½$ second and $\alpha=0.030$ as when $t=1$ second and $\alpha=0.015$. Likewise, the set of coefficients determined for $t=1$ second on the first record, i.e. $A_2$, $B_2$, $C_2$, and $D_2$, can be applied at $t=½$ second on the second record; the set for $t=3/2$ second, i.e. $A_3$, $B_3$, $C_3$, and $D_3$, can be applied at $t=3/4$ second on the new record; etc. If high values of the attenuation rate, $\alpha$, are encountered, the original set of coefficients will have to be determined for several seconds beyond the usual record time so that the shrinkage applied to the approximation times will allow the record with the higher rate to have values of A, B, C, and D applied along its entire length.

Another complication is that, in general, the attenuation rate will not be constant over the length of a trace, since $\alpha$ is a property of the material the seismic wave is traveling in. However, it is still possible to use a single set of coefficients A, B, C, and D to process data with time varying attenuations by applying the old data at new times. The procedure which is followed is illustrated in FIG. 4. Derivative coefficients are placed closer together in areas where the attenuation rate is high, and further apart where it is low. For example, suppose that the original coefficients were determined at 1/6th second intervals on a first record that had an attenuation rate of 0.015. If a second record has an average attenuation rate of 0.030 during the first 1/12 second, the coefficients used in the old data at 1/6the second, i.e. A, B, C, and D, will be applied to the new data at 1/12 second. If the average attenuation rate then changes to 0.010 for the next ½ second, the coefficients at $t=⅙$ second, i.e. $A_2$, $B_2$, $C_2$, and $D_2$, will be applied to the second record at $t=½$ second. When the next set of coefficients is determined for the first record, i.e. at $t=½$ second, the attenuation rate for the second record is 0.0075; therefore, values $A_3$, $B_3$, $C_3$, and $D_3$ will be applied to the second record at $t=1$ second.

Figure 5:
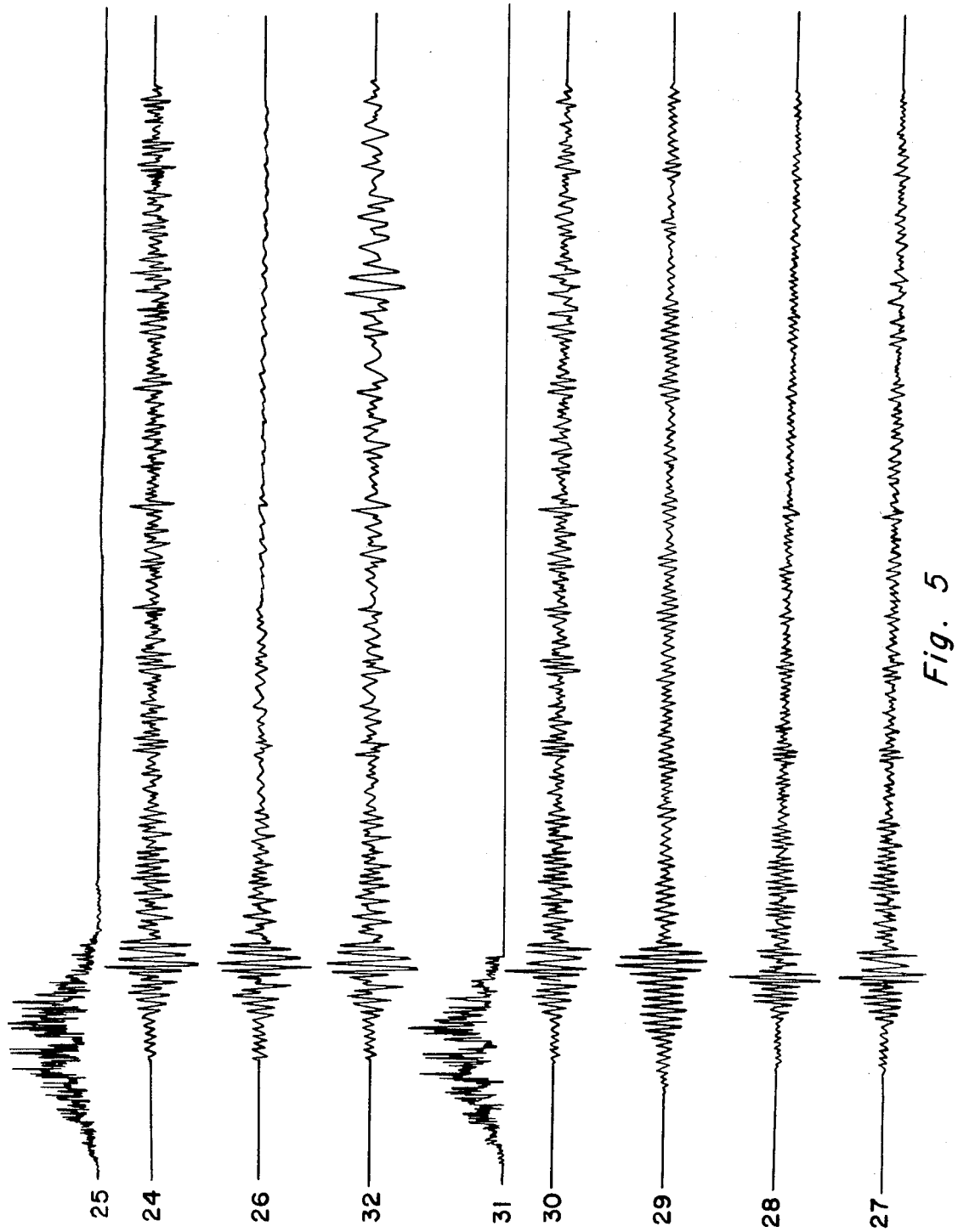
FIG. 5 is a series of drawings of a seismic trace showing the results of processing according to the invention.

An example of the application of the invention to processing seismic data is given in FIG. 5. A synthetic seismogram 24 was generated by convolving a known wavelet with a field reflection coefficient log. The Fourier transform 25 of seismogram 24 is shown immediately above the trace. Frequency dependent attenuation was applied to 24 with the result that its amplitude decreased with time as shown by trace 26. Waveforms 27, 28, and 29 are the second, fourth, and sixth derivatives, respectively, of 26. Waveform 30 shows the result after dynamic amplitude recovery was applied according to the present invention. Waveform 30 is virtually identical to original seismogram 24, yet was obtained entirely from attenuated wave 26. The Fourier transform of 30 is shown by 31 and again one can see that it is essentially the same as transform 25 of the original trace. A nonfrequency-dependent gain similar to conventional AGC was applied to 26 which resulted in 32. By comparing 30 and 32, it is again evident that considerable improvement in the data resulted by applying Applicants' process.

The invention which is to be protected is defined below in the claims, after due allowance is made for equivalents.

We claim:
1. An automatic machine-implemented process for improving a seismic trace whereby attenuated frequencies are restored comprising
   a. taking a series of consecutive even numbered derivatives of the seismic trace starting with the second derivative,
   b. adjusting the gain of the seismic trace and each of said even numbered derivatives with respect to time to predetermined levels, and
   c. combining the seismic trace and only said even numbered derivatives following the gain adjustment to obtain a trace characterized by amplitude recovery, wherein each of steps (a), (b), and (c) is performed without human intervention.

2. A process according to claim 1 where the second and fourth derivatives are determined in step (a).

3. A process according to claim 1 where the second, fourth, and sixth derivatives are determined in step (a).

4. An automatic machine-implemented process for compensating a seismic trace for frequency dependent attenuation comprising
   a. taking a progression of even numbered derivatives of the seismic trace including the second derivative,
   b. weighting the seismic trace and each even numbered derivative thus obtained differently with respect to time by multiplying them with separate predetermined gain functions, and
   c. summing the gain compensated seismic trace and said even numbered derivatives, while excluding all odd numbered derivatives, to produce an amplitude corrected trace, wherein each of steps (a), (b), and (c) is performed without human intervention.

5. A process according to claim 4 where the second and fourth derivatives are determined in step (a).

6. A process according to claim 4 where the second, fourth, and sixth derivatives are determined in step (a).

FO-1050
(5/69)

UNITED STATES PATENT OFFICE
CERTIFICATE OF CORRECTION

Patent No. __3,582,873__ Dated __June 1, 1971__

Inventor(s) __Charles Floyd George, Jr.; Howard A. Slack; and Ronald K. Scudder__

It is certified that error appears in the above-identified patent and that said Letters Patent are hereby corrected as shown below:

On the front page following [45] insert --[73] Assignee Atlantic Richfield Company--. Column 1, line 18, insert --Glazier et al-- between "to" and "U.S.". Column 2, equation (1), that portion of the formula reading $b_k \sin(2\pi n K \Delta T)$ should read $b_k \sin(2\pi n K F \Delta T)$ Column 2, line 16, "e" should read --$e^{-\alpha ft}$--; line 17, "tenuated" should read --tenuation--; equation (7), that portion of the formula reading $[a_i \omega_i^2 + \cos(\omega_i t)$ should read $[a_i \omega_i^2 \cos(\omega_i t)$ Column 3, equation (13), that portion of the formula reading $+ C\omega^4_i$   should read   $+ C\omega_i^4$ Column 4, line 3, "$s'_2 Qt)$" should read --$s'_2(t)$--; line 67, ahead of equation (17), insert --The function--. Column 6, line 11, "1/6the" should be --1/6th--.

Signed and sealed this 23rd day of November 1971.

(SEAL)
Attest:

EDWARD M. FLETCHER, JR.
Attesting Officer

ROBERT GOTTSCHALK
Acting Commissioner of Patents